United States Patent [19]

Schröder

[11] Patent Number: 4,598,727

[45] Date of Patent: Jul. 8, 1986

[54] METHOD OF REMOVING CHIPS FROM THE END PORTION OF AN UPWARDLY EXTENDING CONDUIT

[75] Inventor: Günter Schröder, Minden-Dützen, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 647,022

[22] Filed: Sep. 4, 1984

[30] Foreign Application Priority Data

Sep. 1, 1983 [DE] Fed. Rep. of Germany ....... 3331492

[51] Int. Cl.⁴ .......................................... F16L 37/28
[52] U.S. Cl. ................................. 137/15; 29/402.08; 137/13; 137/315; 137/334; 138/89; 138/97; 376/309; 376/463; 405/156
[58] Field of Search ................ 29/402.08; 138/97, 89; 376/260, 309, 463; 137/15, 315; 405/156, 61; 137/13, 334

[56] References Cited

U.S. PATENT DOCUMENTS

| 3,710,812 | 1/1973 | Wise | 138/97 X |
|---|---|---|---|
| 4,255,840 | 3/1981 | Loch et al. | 29/402.08 X |
| 4,370,862 | 2/1983 | Brister | 138/97 X |

FOREIGN PATENT DOCUMENTS

| 2137434 | 2/1973 | Fed. Rep. of Germany | 137/15 |
|---|---|---|---|
| 2082708 | 3/1982 | United Kingdom | 138/97 |

*Primary Examiner*—Howard N. Goldberg
*Assistant Examiner*—Joseph M. Gorski
*Attorney, Agent, or Firm*—Walter Ottesen

[57] ABSTRACT

The invention is directed to a method of performing remotely-manipulated maintenance work on upwardly extending conduits in a radioactively-ladened cell such as a large-area cell of a nuclear facility for reprocessing irradiated nuclear fuel. A conduit segment is sawn out of a vertical conduit and a new conduit segment welded into place. The removal of cutting chips from the lower vertical end portion of the conduit after the conduit segment has been sawn out is achieved by freezing the liquid medium in the conduit to form frost plugs above and below the tube portion to be removed. A third frost plug is formed in the lower portion of the vertical conduit above the frost plug which has already been produced therein. Thereafter, the tube portion to be removed is cut and separated from the conduit. Then an anchor member is lowered into the lower end portion of the conduit onto the third frost plug. The liquid medium in the lower end of the conduit above the third frost plug is frozen with the cutting chips and the anchor member and, with aid of the anchor member, is withdrawn from the lower end portion of the conduit in an upward direction together with the third frost plug.

3 Claims, 2 Drawing Figures

METHOD OF REMOVING CHIPS FROM THE END PORTION OF AN UPWARDLY EXTENDING CONDUIT

FIELD OF THE INVENTION

The invention relates to a method for performing remotely-manipulated maintenance work on upwardly extending conduits conducting liquid and disposed in a radioactively-ladened cell such as a large-area cell of a nuclear facility for reprocessing irradiated nuclear fuel. The maintenance work includes the removal of a segment of conduit and replacing the same with a new conduit segment.

BACKGROUND OF THE INVENTION

In radioactively-ladened shielded cells such as large-area cells in a nuclear reprocessing facility, maintenance of the process components and the conduits interconnecting the same must be carried out by remote manipulation. If it is necessary during maintenance operations to remove a segment of a conduit from a vertical conduit and weld a fresh segment into place, care must be taken to ensure that the chips which are formed during the severing operation and/or the preparation of the weld seam do not remain in the conduit and thus contaminate the liquid medium therein.

Removing the cutting waste from the upper end of the conduit does not give rise to any problems. However, removing such material from the lower end of the conduit causes difficulties. The chips accumulate on the frost plug which is formed in the conduit and which was produced underneath the lower saw cut in the lower end portion of the conduit by means of a suitable freezing apparatus. The chips penetrate into the frozen plug and can only be partially removed if at all.

SUMMARY OF THE INVENTION

It is an object of the invention to provide a method for performing remotely-manipulated maintenance work on upwardly extending conduits wherein chips are removed completely and with certainty from the lower upwardly extending end portion of the conduit after a conduit segment has been cut therefrom.

The method of the invention is for performing remotely-controlled maintenance work on upwardly extending conduits conducting liquid and disposed in a radioactively-ladened cell such as a large-area cell of a nuclear facility for reprocessing irradiated nuclear fuel. The maintenance work includes the removal of a conduit segment. The method includes the steps of: forming upper and lower frost plugs in the conduit at respective positions above and beneath upper and lower cutting locations at which the conduit is to be cut to remove the conduit segment; forming a third frost plug above the lower frost plug so as to be spaced therefrom and be beneath the lower cutting location; cutting the conduit at the upper and lower cutting locations and removing the conduit segment therefrom whereby chips produced by the cutting step drop into the liquid in the portion of the conduit above the third frost plug and the lower cutting location; lowering holding means into the end of the conduit beneath the lower cutting location and immersing the same into the liquid; freezing the liquid containing the chips so as to cause the liquid and the third frost plug to conjointly define a common frost plug; and, removing the common frost plug from the conduit with the aid of the holding means.

Before a segment of conduit is cut from a vertical conduit, a first frost plug is formed below the intended lower cutting location so that the lower end of the vertical conduit is closed off after the conduit segment to be removed has been cut out. A second frost plug is formed above the upper cutting location to close the upper end of the conduit in a downward direction. Below the intended lower cutting location but still above the first frost plug, the medium in the conduit is frozen at a third position. Therefore, below the lower cutting location there are two frost plugs which are disposed one above the other and in spaced relationship to each other. By sawing within the two predetermined cutting locations, the portion of conduit to be removed is cut out and taken away. The chips and dust which are formed at the cutting locations when sawing through the conduit and which drop into the lower conduit end portion are caught by the upper one of the two frost plugs in the lower end portion of the conduit.

In order to remove the chips, holding means in the form of an anchor member is let down into the lower end of the conduit and onto the third frost plug. The liquid medium which is still present on the frost plug is frozen in the region adjacent the third frost plug. By virtue of this freezing step, the chips and the anchor member are fixed in a common frost plug which is formed from the third frost plug and the medium which was frozen after the sawing operation and which contains the chips. The common or integral frost plug is removed from the lower end of the conduit in an upward direction with the aid of the anchor member. In this way, the chips in the vertical conduit are completely removed.

If heat is applied to both the frozen portion containing the chips and the third frost plug which is frozen thereto, the common frost plug can be easily removed with the chips frozen therein.

If a heated anchor member is pressed onto the third frost plug, the anchor member melts into the plug. By virtue of the subsequent operation of freezing the liquid which is above the third frost plug and which contains the chips, the anchor member is frozen into the third frost plug and into the freshly frozen portion of liquid thereon. This further facilitates the step of withdrawing the common frost plug conjointly defined by the freshly frozen portion of liquid and the third frost plug to remove the cutting chips.

The invention has been found to be particularly suitable in removing non-magnetic metal chips and dust from the lower ends of vertical conduits which have been sawn through.

BRIEF DESCRIPTION OF THE DRAWING

The invention will now be described in greater detail with reference to the drawing wherein.

DESCRIPTION OF THE PREFERRED EMBODIMENTS OF THE INVENTION

Figure 1:
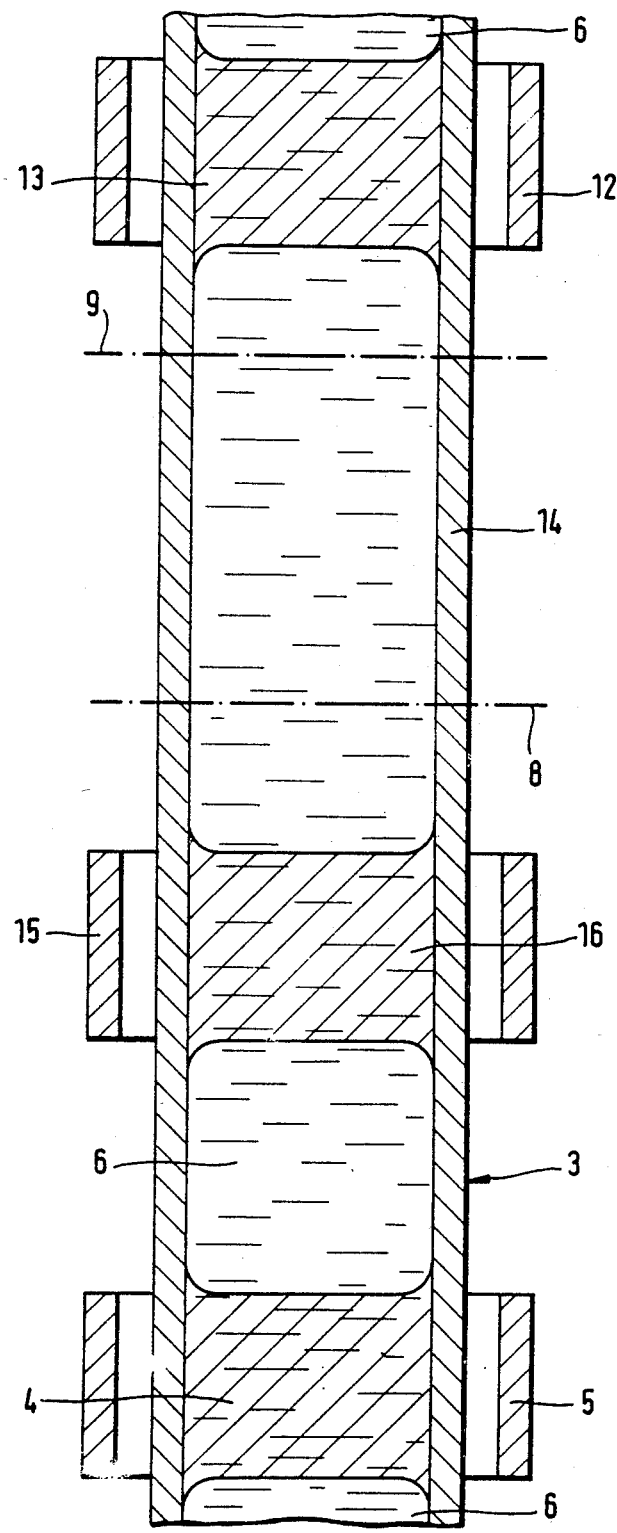
FIG. 1 is a side elevation view, in section, of a vertical conduit with frost tongs applied thereto for freezing the liquid medium in the conduit to form the frost plugs as required by the method of the invention; and, FIG. 2 is a side elevation view of the vertical lower end of the conduit after a conduit segment has been sawn out of the conduit of FIG. 1.

A first frost plug 4 is formed in a vertical conduit 3 by applying frost tong 5 which is operated with liquid nitrogen. At that elevation in the conduit 3, the liquid medium 6 is frozen below a predetermined lower cutting location 8.

A frost tong 12 is also applied above a predetermined upper cutting location 9 to form a frost plug 13. The frost plug 13 seals off the conduit 3 above the conduit segment 14 which is to be cut out. The frost plug 4 seals off the conduit 3 below the conduit segment 14.

Somewhat above the first frost plug 4, the medium 6 in the conduit is frozen at a third location by a frost tong 15 thereby forming a third frost plug 16.

After the three frost plugs 4, 13 and 16 shown in FIG. 1 have been formed in the conduit 3 carrying the liquid medium, the conduit portion 14 is cut out of the conduit 3 by sawing within the two cutting locations 8 and 9 and removed.

Figure 2:
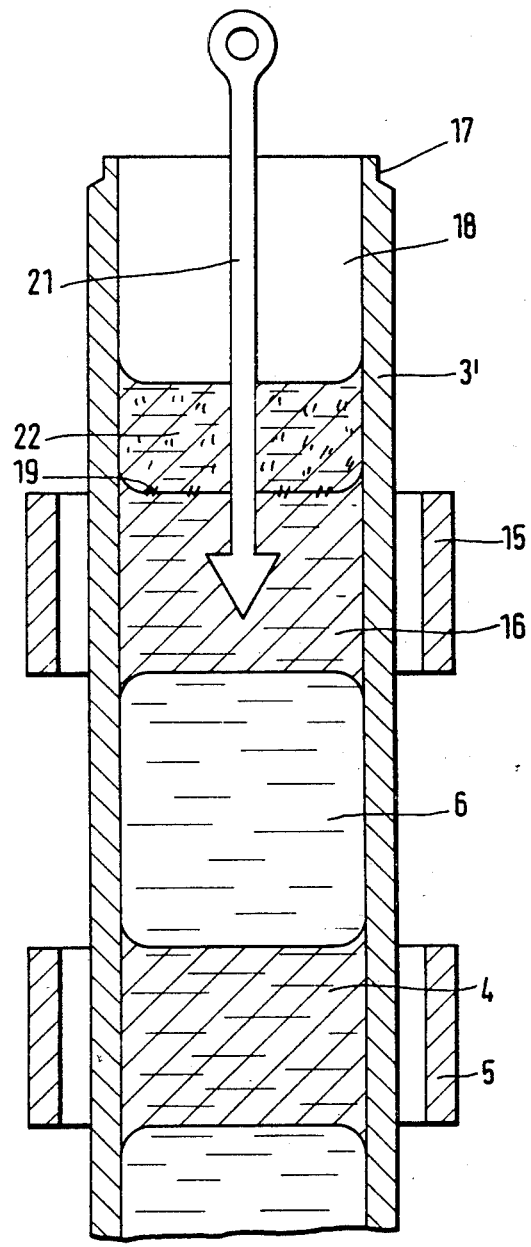

FIG. 2 shows the lower end 3' of the conduit after the conduit portion 14 has been cut out and removed. The step of preparing the end face of the end 3' of the conduit has been completed whereby the stepped annular recess 17 has been formed.

Above the third frost plug 16 there is still residual liquid 18 which, just above the frost plug 16, contains the metal chips 19 which were formed in the mechanical machining operation carried out on the conduit 3 and which are pressed into the frost plug 16. A heated anchor member 21 is pressed into the third frost plug 16 in the lower end portion 3' of the conduit. The residual liquid 18 is now frozen in the adjoining region 22 above the frost plug 16 by shifting the frost tong 15 and, together with the third frost plug 16, forms a coherent, common frost plug 16, 22 which encloses the metal chips and the anchor member 21.

After the common or integral frost plug 16, 22 has been formed, the frost tong 15 can be replaced by a heating sleeve or jacket or the supply of cold for maintaining the frost plug 16, 22 is cut off until the composite frost plug 16, 22 thaws at the wall of the conduit. After a slight application of heat, the composite frost plug 16, 22 can be withdrawn upwardly from the lower end portion 3' of the conduit by means of a manipulator which engages the upper end of the anchor member 21. That necessarily removes all chips and dust 19 which are frozen in the frost plug 16, 22 that is formed after the sawing operation and/or the operation of preparing the weld joint. The lower end portion 3' of the conduit is freed of all chips and dust 19 and the operation of welding a fresh replacement conduit segment into position can begin.

It is understood that the foregoing description is that of the preferred embodiments of the invention and that various changes and modifications may be made thereto without departing from the spirit and scope of the invention as defined in the appended claims.

What is claimed is:

1. Method for performing remotely-controlled maintenance work on upwardly extending conduits conducting liquid and disposed in a radioactively-ladened cell such as a large-area cell of a nuclear facility for reprocessing irradiated nuclear fuel, the maintenance work including removal of a conduit segment, the method comprising the steps of:

forming an upper frost plug in said conduit at a position above an upper cutting location;

forming a lower frost plug in said conduit at a position beneath a lower cutting location.

forming a third frost plug above said lower frost plug so as to be spaced from said lower frost plug and be beneath said lower cutting location;

cutting said conduit at said upper and lower cutting locations and removing the conduit segment from said coduit so that whereby chips produced by the cutting step drop into the liquid in a portion of the conduit above said third frost plug and beneath said lower cutting location;

lowering holding means into an end of the conduit beneath said lower cutting location and immersing said holding means into said liquid containing said chips;

freezing said liquid containing said chips so as to cause said liquid and said third frost plug to conjointly define a common frost plug; and, removing said common frost plug from said conduit by lifting said holding means.

2. The method of claim 1, wherein said holding means is an anchor-like member and the method comprises the further step of applying heat to said common frost plug so as to loosen said common frost plug to faciliate removal of said common frost plug from said conduit.

3. The method of claim 2, comprising the further step of heating said anchor-like member before lowering said anchor-like member into the end of the conduit beneath said lower cutting location; then pressing said anchor-like member into said third frost plug; and then freezing said liquid and said third frost plug so as to cause said anchor-like member to be frozen into said common frost plug.

* * * * *

UNITED STATES PATENT AND TRADEMARK OFFICE
CERTIFICATE OF CORRECTION

PATENT NO. : 4,598,727
DATED : July 8, 1986
INVENTOR(S) : Günter Schröder

It is certified that error appears in the above-identified patent and that said Letters Patent is hereby corrected as shown below:

In column 4, line 19: delete "location." and substitute -- location; -- therefor.

In column 4, line 25: delete "coduit" and substitute -- conduit -- therefor.

In column 4, line 25: delete "whereby".

In column 4, line 42: delete "faciliate" and substitute -- facilitate -- therefor.

Signed and Sealed this

Twenty-third Day of September 1986

[SEAL]

Attest:

DONALD J. QUIGG

Attesting Officer

Commissioner of Patents and Trademarks